United States Patent
Iwamoto et al.

(10) Patent No.: US 6,520,249 B2
(45) Date of Patent: Feb. 18, 2003

(54) LOW-TEMPERATURE WASTE-HEAT-GAS DRIVEN REFRIGERATION SYSTEM

(75) Inventors: Takashi Iwamoto, Hokkaido (JP); Hiroyuki Togo, Hokkaido (JP); Masamitsu Murai, Hokkaido (JP); Ritsu Miura, Kanagawa (JP); Koji Hattori, Kanagawa (JP); Harunobu Takeda, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/876,115

(22) Filed: Jun. 8, 2001

(65) Prior Publication Data

US 2001/0050163 A1 Dec. 13, 2001

(30) Foreign Application Priority Data

Jun. 9, 2000 (JP) .................................. 2000-174366

(51) Int. Cl.[7] .............................................. F28D 15/00
(52) U.S. Cl. .................. 165/104.12; 165/901; 165/909; 165/10; 165/47; 62/477; 62/480
(58) Field of Search ........................ 165/10, 54, 104.12, 165/47, 909, 901; 62/470, 480, 477, 478, 476

(56) References Cited

U.S. PATENT DOCUMENTS

| 4,548,044 | A | * | 10/1985 | Sakai et al. ............. | 165/104.12 |
|---|---|---|---|---|---|
| 4,623,018 | A | * | 11/1986 | Takeshita et al. ....... | 165/104.12 |
| 4,736,596 | A | * | 4/1988 | Iguchi et al. ........... | 165/104.12 |
| 4,741,156 | A | * | 5/1988 | Buchner ................. | 165/104.12 |
| 4,995,235 | A | * | 2/1991 | Halene .................... | 165/104.12 |
| 5,165,247 | A | * | 11/1992 | Rockenfeller et al. . | 165/104.12 |
| 5,279,359 | A | * | 1/1994 | Erickson ................. | 165/104.12 |
| 5,442,931 | A | * | 8/1995 | Ryan et al. ............. | 165/104.12 |
| 5,623,987 | A | * | 4/1997 | Golben et al. .......... | 165/104.12 |

* cited by examiner

Primary Examiner—Christopher Atkinson
(74) Attorney, Agent, or Firm—Sughrue Mion, PLLC

(57) ABSTRACT

High-temperature-side hydrogen storage alloy containers each containing a hydrogen storage alloy are disposed as a heat exchanging portion in high-temperature-side heat exchangers. Low-temperature waste-heat gas generated in a micro gas turbine is imported into the heat exchangers so that direct heat exchange is performed between the waste-heat gas and each of the alloy containers. On the other hand, low-temperature-side hydrogen storage alloy containers each containing a hydrogen storage alloy are disposed as a heat exchanging portion in low-temperature-side heat exchangers. The high-temperature-side alloy containers and the low-temperature-side alloy containers are connected to each other by hydrogen-travelling pipes. Cold heat generated in the low-temperature-side heat exchangers is supplied to a refrigeration output portion.

4 Claims, 3 Drawing Sheets

EXHAUST GAS

HYDROGEN STORAGE ALLOY

LOW-TEMPERATURE WASTE-HEAT-GAS DRIVEN REFRIGERATION SYSTEM

CROSS REFERENCE TO RELATED APPLICATIONS

The present invention is based on Japanese Patent Application No. 2000-174366, which is incorporated herein by reference.

BACKGROUND OF THE INVENTION

1. Field of the Invention

The present invention relates to a low-temperature waste-heat-gas driven refrigeration system using relatively low temperature waste-heat gas generated from a micro gas turbine or the like so that a refrigeration output can be obtained efficiently.

2. Description of the Related Art

Recently, attention has been paid to a micro gas turbine electric power plant as a distributed electric source capable of generating electric power efficiently and capable of reducing the system size. The plant uses natural gas or biogas as fuel and the fuel is burned to operate a small-sized gas turbine to thereby generate electric power. However, the energy efficiency in the plant is not sufficiently high. A large amount of energy is lost as waste heat into exhaust gas. Therefore, a method of recovering the waste heat to use it effectively has been researched and a system of obtaining hot water from such waste heat has been proposed. The range of use of hot water, or the like, is however limited and the whole amount of the hot water cannot be always used. Thus waste heat is not used sufficiently effectively.

On the other hand, although the field to which the method is applied is different from the field of micro gas turbine, methods using high-temperature waste heat generated from a factory or the like, as a driving source to obtain a refrigeration output by means of hydrogen storage alloys have been developed by the Applicant of the present application. In such methods, improvement in energy-utilizing efficiency can be attained because a refrigeration output can be obtained by use of waste heat.

Hence, if such a refrigeration output can be obtained in a system by use of waste heat discharged from the aforementioned micro gas turbine, total energy efficiency is improved greatly. Moreover, it is easy to reduce the size of the system. If this system can be realized, this system can be used as a high-energy-efficiency system in a food factory, a convenience store, a supermarket, a hospital, a hotel, or the like, using such a refrigeration output as well as electric power.

In the micro gas turbine, however, heat exchange between exhaust gas and intake air is generally performed in order to improve electric power generating efficiency. Because exhaust gas is discharged after the heat exchange, the temperature of the exhaust gas is relatively low and the amount of the exhaust gas is small. It is therefore difficult to obtain high-temperature high-pressure steam from the exhaust gas. If the temperature of the steam is low, hydrogen cannot be released securely because the high-temperature-side hydrogen storage alloy cannot be heated sufficiently. As a result, sufficient cold heat cannot be obtained in the low-temperature-side hydrogen storage alloy. Hence, it was conceived in the background art that a refrigeration output could be hardly obtained by use of such relatively low temperature waste heat.

SUMMARY OF THE INVENTION

The present invention is designed upon such circumstances as the background, and it is an object of the present invention to provide a low-temperature waste-heat-gas driven refrigeration system in which thermal energy is effectively obtained from relatively low temperature waste heat generated from a micro gas turbine, or the like, so that the thermal energy can be used as a driving source to thereby generate cold heat for refrigeration.

In order to solve the above problem, according to a first aspect of the present invention, there is provided a low-temperature waste-heat-gas driven refrigeration system comprising: a high-temperature-side heat exchanger as a high-temperature-side heat exchanging portion, provided with high-temperature-side hydrogen storage alloy containers arranged substantially in parallel so as to form gaps, each of said high-temperature-side hydrogen storage alloy containers provided with a pipe body and containing a hydrogen storage alloy so as to be aerated for absorbing and releasing hydrogen, and one of a low-temperature waste-heat gas and a cooling heat medium being selectively imported into said high-temperature-side heat exchanger so as to perform heat exchange therebetween; and a low-temperature-side heat exchanger provided with low-temperature-side hydrogen storage alloy containers as a low-temperature-side heat exchanging portion, each of said low-temperature-side hydrogen storage alloy containers containing a hydrogen storage alloy for absorbing and releasing hydrogen, and a cold-heat heat medium being imported into said low-temperature-side heat exchanger so as to perform heat exchange therebetween; wherein said low-temperature-side hydrogen storage alloy containers is connected to said high-temperature-side hydrogen storage alloy containers so that hydrogen move therebetween; and cold heat is supplied into a refrigeration output portion through said cold-heat heat medium which receives cold heat in said low-temperature-side heat exchanger.

According to a second aspect of the present invention, in the low-temperature waste-heat-gas driven refrigeration system as defined in the first aspect, preferably, the waste-heat gas is generated by combustion of fuel in a micro gas turbine.

According to a third aspect of the present invention, in the low-temperature waste-heat-gas driven refrigeration system as defined in the first or second aspect, preferably, the high-temperature-side heat exchanging portion is configured so that the waste-heat gas passes through the gaps in a direction crossing the longitudinal direction of the pipe bodies.

According to the present invention, waste heat is used as a driving source. A micro gas turbine is a typical example of a source generating such waste heat. However, the source generating such waste heat according to the present invention is not limited thereto. The present invention may be applied to various kinds of generating sources. The present invention is originally based on the assumption that it is difficult to obtain high-temperature high-pressure steam from the waste heat and the waste heat the temperature of which is relatively low is mainly used. The temperature of the waste heat is not limited specifically to the relatively low one and higher-temperature waste heat may be also used. That is, the present invention provides a refrigeration system which can be driven even by relatively low temperature waste heat, but the condition that the temperature of waste heat is low is not the requirement of the present invention.

The present invention requires a high-temperature-side hydrogen storage alloy and a low-temperature-side hydrogen storage alloy in the same manner as in the background art. These hydrogen storage alloys are not limited to specific kinds of alloys and suitable alloys may be selected as the hydrogen alloys. Incidentally, when the alloys are selected, it is preferable to consider the heating temperature on the high temperature side alloy as well as the freezing temperature on the low temperature side alloy.

These hydrogen storage alloys are contained in alloy containers in a condition that hydrogen can be released. The absorption and release of hydrogen can be achieved when an aeration material is disposed in each container or an aeration passage is secured to make it possible to move hydrogen. Each of the alloy containers is made of a material having a shape adapted for heat exchange or good in heat conduction because the alloy container serves as a heat exchanging portion. Consideration is made so that the contact between the high-temperature-side alloy and the waste-heat gas or the cooling heat medium can be made effectively. Particularly, the contact and heat exchange between the high-temperature-side alloy containers and the waste-heat gas are important to the present invention. As an example of the configuration in which such contact and heat exchange are made well, there is provided a system in which: each of the hydrogen storage alloy containers is shaped like a pipe body containing a hydrogen storage alloy; the hydrogen storage alloy containers are arranged vertically and horizontally as a large number of containers so that gaps are formed among the pipe bodies; and the waste-heat gas passes through the gaps in a direction crossing the longitudinal direction of the pipe bodies. Incidentally, the number of the pipe bodies arranged vertically and horizontally, the size of the gaps, etc. can be determined suitably.

According to the aforementioned configuration, waste-heat gas smoothly passes through the gaps among the pipe bodies. Hence, applying load to a waste-heat gas-generating source such as a micro gas turbine can be avoided. Moreover, the waste-heat gas can be subjected to heat exchange with the pipe bodies efficiently because the waste-heat gas flows along the outer walls of the pipe bodies. On this occasion, the waste-heat gas flows in a direction crossing the longitudinal direction of the pipe bodies. Hence, variation in heat exchange efficiency can be reduced in the longitudinal direction of the pipe bodies, so that the hydrogen storage alloy contained in the pipe bodies can be heated evenly.

The present invention is not limited to the aforementioned configuration. According to the present invention, the high-temperature-side heat exchanger structure makes it possible that the alloy containers and the hydrogen storage alloy contained in the alloy containers are heated directly by waste-heat gas. Hence, even in the case where the temperature of the waste-heat gas is relatively low, the hydrogen storage alloy containers and the hydrogen storage alloy contained therein can be heated sufficiently as a driving source for a refrigeration output.

The waste-heat gas is imported into a heat exchanger and discharged after heat exchange. Because of heat exchange with alloy containers, the temperature of the waste-heat gas on the discharge side is lower than that on the import side. Hence, heat energy obtained in the alloy containers on the discharge side may become so low that there is a fear that the alloy is not heated evenly in accordance with the position in the container. The following configuration is effective in coping with the fear. That is, the heat exchanging efficiency of the alloy containers on the discharge side of the waste-heat gas is made continuously or stepwise higher than that of the alloy containers on the import side of the waste-heat gas. In this configuration, the material of the alloy containers on the discharge side may be selected to be different from that of the alloy containers on the import side so that the alloy containers good in heat conduction are disposed on the discharge side. Alternatively, the heat exchanging efficiency on the discharge side may be made to be different from that on the import side by difference in the shape of the alloy containers, the presence or absence of arrangement of fins provided in the alloy containers, the number of the fins arranged, the density of arrangement of the fins, the shape of the fins, etc. Uniformity of heating may be attained by the change of the heat capacity distribution of the pipe bodies besides the change of the heat exchanging efficiency. For example, the density of arrangement of the pipe bodies may be changed so that the density is high on the import side of the waste-heat gas and low on the discharge side of the waste-heat gas. For example, the sectional area of the pipe bodies may be changed so that the sectional area of the pipe bodies is large on the import side of the waste-heat gas and small on the discharge side of the waste-heat gas. As a result, it is easy to conduct heat on the discharge side. Hence, hydrogen can be generated efficiently because the hydrogen storage alloy can be heated evenly.

On the other hand, in the low-temperature-side heat exchanger, heat exchange is performed between a cold-heat heat medium and each hydrogen storage alloy container. A heat medium liquid is generally used as the cold-heat heat medium, so that heat exchange can be performed easily between the medium and the container. Therefore, any special measure is not required on the low-temperature-side heat exchanger according to the present invention, so that the same configuration as that in the background art can be used. A hydrogen-travelling passage is provided between the low-temperature-side hydrogen storage alloy and the high-temperature-side hydrogen storage alloy so that hydrogen can move between the two alloys.

Incidentally, the cold heat obtained in the low-temperature-side heat exchanger is transmitted to the cold-heat heat medium. The cold-heat heat medium can be circulated to thereby move the cold heat to a cold-heat utilizing portion directly or indirectly through another heat exchanger, or the like. Although a refrigerator for reserving foods is taken as an example of the cold-heat utilizing portion, the present invention is not limited thereto but can be applied to any system requiring refrigeration.

When the system according to the present invention is attached to a micro gas turbine, a refrigeration output can be obtained from waste heat in addition to generation of electric power. Hence, total energy efficiency is improved greatly.

DETAILED DESCRIPTION OF THE PREFERRED EMBODIMENTS

An embodiment of the system using waste heat of a micro gas turbine electric power plant according to the present invention will be described below with reference to the accompanying drawings.

Figure 1:
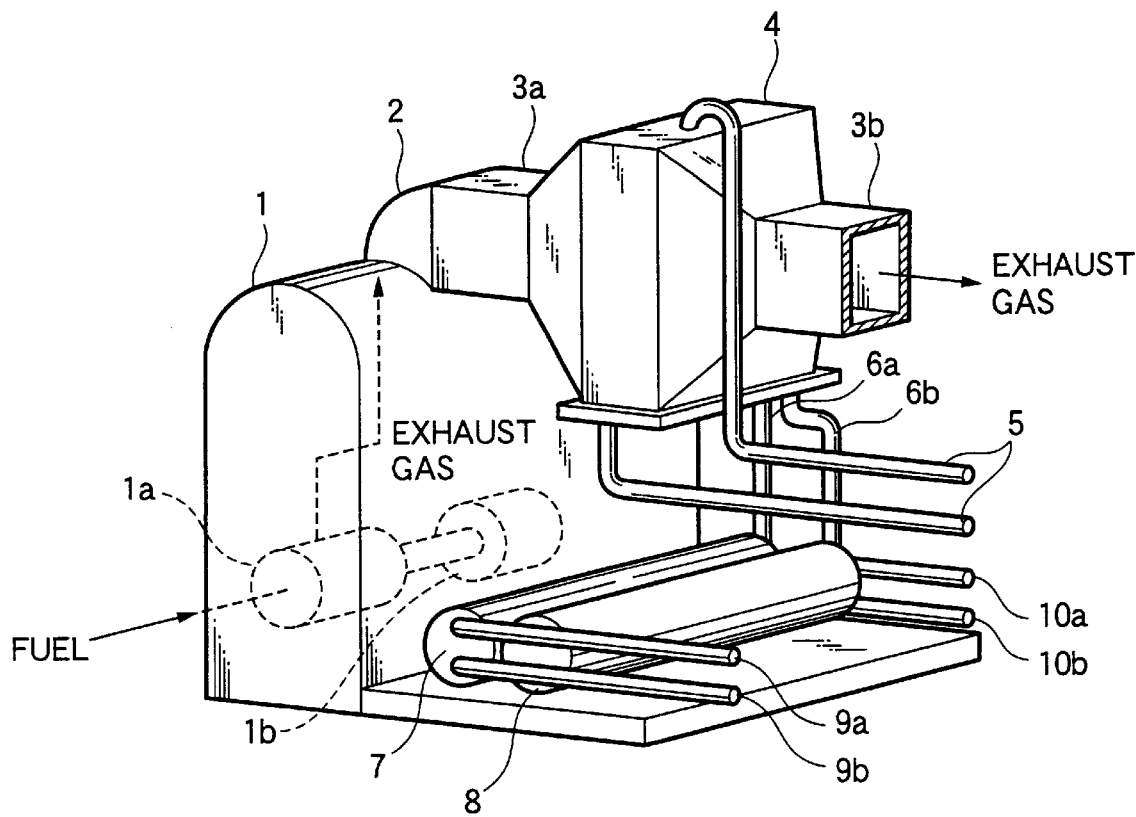
FIG. 1 is an overall perspective view showing an embodiment of the present invention.

As shown in FIG. 1, a gas turbine electric power plant 1 has a gas turbine 1a and an electric generator 1b in the inside of the plant 1 and further has an exhaust duct 2 for discharging exhaust gas generated in the gas turbine 1a.

A high-temperature-side heat exchanger 4 shaped like a container is connected to the exhaust duct 2 through an exhaust gas-importing duct 3a so that exhaust gas is imported into the heat exchanger 4. The heat exchanger 4 is provided with an exhaust gas duct 3b so that the exhaust gas imported into the heat exchanger 4 is discharged to the outside. A hydrogen storage alloy container which will be described later is disposed as a high-temperature-side heat exchanging portion in the high-temperature-side heat exchanger 4. A cooling water pipe 5 is connected to the heat exchanger 4 so that cooling water to be brought into contact with the alloy container is imported or discharged. Hydrogen-travelling pipes 6a and 6b to be connected to the alloy container are connected to the heat exchanger 4 from the outside.

Two pairs of heat medium pipes 9a, 9b and 10a, 10b are connected to the heat exchangers 7 and 8 respectively so that a heat medium for cold heat or cooling is imported or discharged through the pipes 9a, 9b, 10a, 10b so as to be brought into contact with the alloy containers 71 and 81.

Two pairs of heat medium pipes 9a and 9b; 10a and 10b are connected to the heat exchangers 7 and 8 respectively so that a heat medium for cold heat or cooling is imported or discharged through the pipes 9a and 9b; 10a and 10b so as to be brought into contact with the alloy containers 71 and 81.

Figure 2:
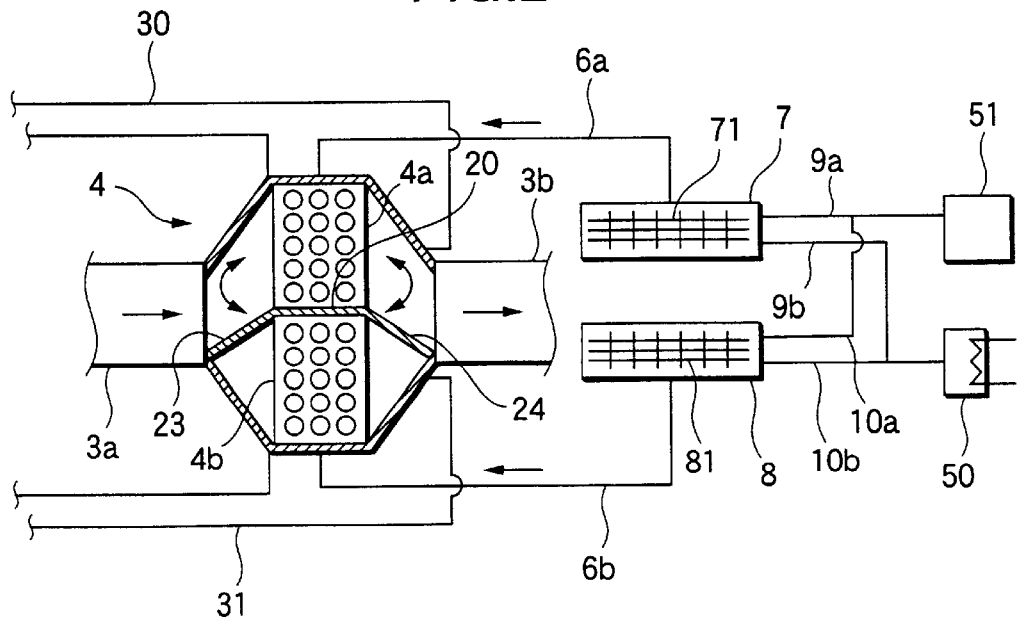
FIG. 2 is a schematic view showing the refrigeration system in the same embodiment.

The internal structure of the high-temperature-side heat exchanger 4 will be described below with reference to FIGS. 2 through 4.

The inside of the heat exchanger 4 is partitioned into two compartments side by side by a partition wall 20 in between the exhaust gas-importing duct 3a and the exhaust gas duct 3b. Two heat exchanging portions are disposed in the two compartments respectively. That is, the heat exchanger 4 is divided into two heat exchangers 4a and 4b. Rotation dampers 23 and 24 are provided just at the back of the exhaust gas-importing duct 3a and just at the front of the exhaust gas duct 3b respectively in the inside of the heat exchanger 4 so that each of the rotation dampers 23 and 24 has one end rotatably fixed to the partition wall 20 so that the dampers 23 and 24 can open or close corresponding one of the compartments. Hence, the two compartments can be selectively open or closed by the rotating operations of the rotation dampers 23 and 24 respectively. The rotating operations of the rotation dampers 23 and 24 can be performed by an actuator(not shown).

Incidentally, the selective opening and closing means are not limited to the dampers and another configuration may be used.

Figure 3:
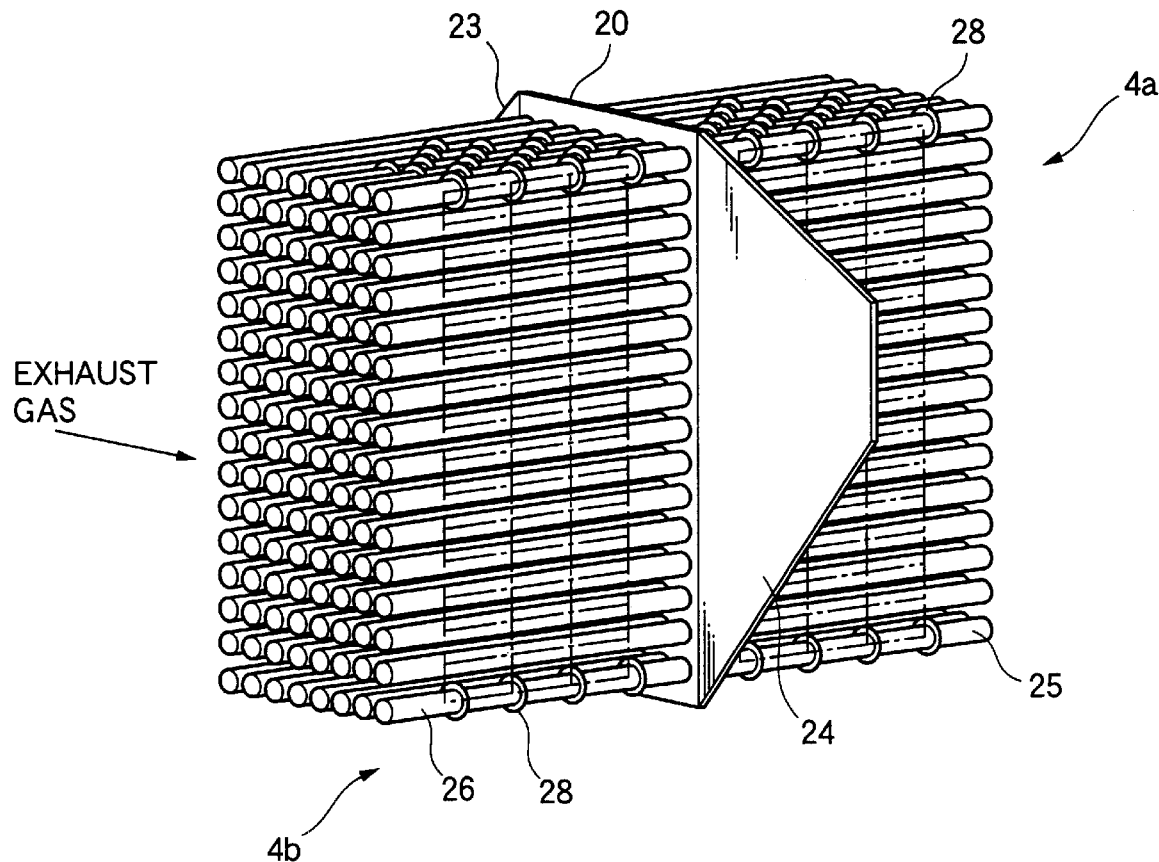
FIG. 3 is an enlarged perspective view showing the internal structure of the high-temperature-side heat exchanger in the same embodiment.

As shown in FIG. 3, hydrogen storage alloy containers 25 and 26 each shaped like a pipe run vertically and horizontally in the heat exchangers 4a and 4b. As shown in FIG. 4, each of the containers 25 and 26 contains hydrogen storage alloy powder and has an aeration material 27 disposed in its inside so that hydrogen can be moved. The group of containers 25 and the group of containers 26 are connected to hollow headers (not shown) common to the groups respectively. The hydrogen-travelling pipes 6a and 6b are connected to the hollow headers respectively.

Figure 4:
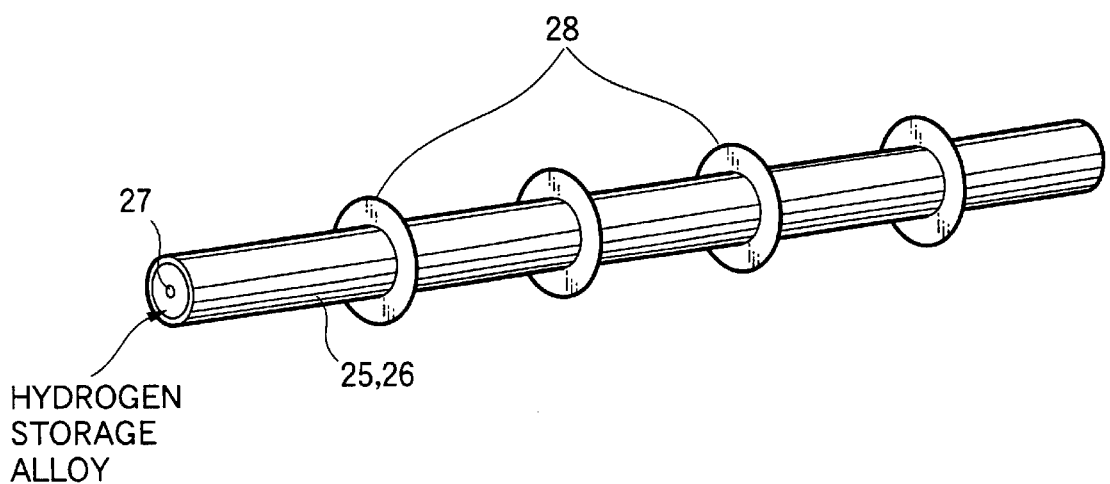
FIG. 4 is an enlarged perspective view showing part of each hydrogen storage alloy container in the same embodiment.
Figure 5:
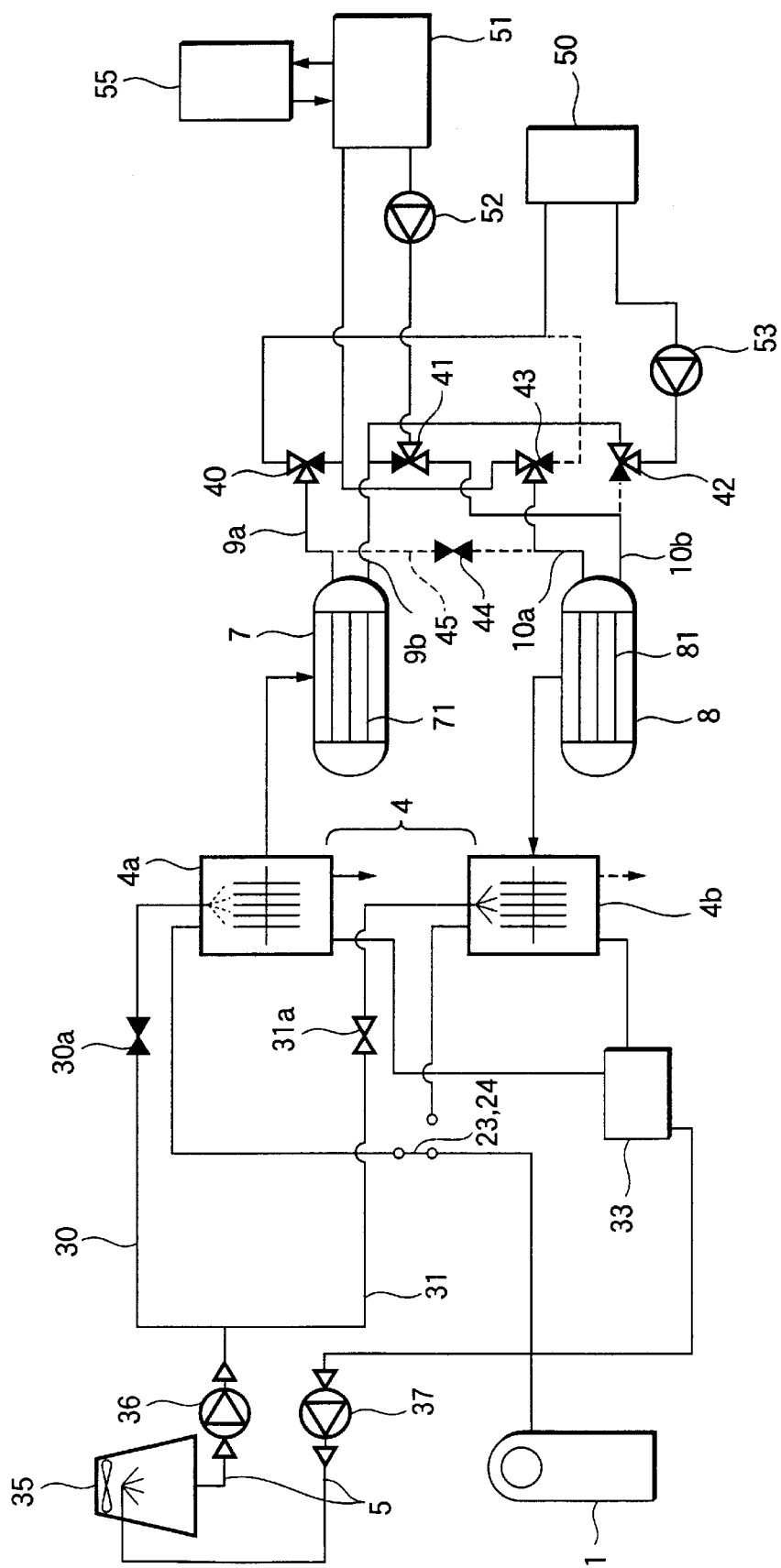
FIG. 5 is an overall schematic view showing the refrigeration system in the same embodiment.

Incidentally, as shown in FIG. 4, each of the alloy containers 25 and 26 is provided with fins 28 disposed in a side near the exhaust gas duct 3b. Hence, heat exchanging efficiency in the exhaust side is higher than that in the exhaust gas-importing side.

Further, the import and discharge sides of the cooling water pipes 5 are connected to the heat exchanger 4 so that cooling water can pass between the two groups of containers 25 and 26 in the condition that the compartments are closed by the rotation dampers 23 and 24. The cooling water pipes 5 are connected to inner pipes 30 and 31 respectively through valves 30a and 31a and a cooling water recovery tank 33. The inner pipes 30 and 31 reach the compartments respectively. The cooling water pipes 5 are further connected to an external cooling tower 35 through cooling water pumps 36 and 37 respectively.

On the other hand, in the low-temperature-side heat exchangers 7 and 8, the heat medium pipes 9a, 9b, 10a, 10b extend to the outside so as to be connected to a valve control circuit (not shown). In the valve control circuit, one port of a three-way valve 40 is connected to the heat medium pipe 9a, another port of the three-way valve 40 is connected to the return flow side of a heat exchanger 50 with respect to cooling water and the other port of the three-way valve 40 is connected to the return flow side of a cold-heat heat medium tank 51. The heat medium pipe 9b is connected to one port of a three-way valve 41 and to one port of a three-way valve 42. Another port of the three-way valve 41 is connected to the delivery flow side of the cold-heat heat medium tank 51 through a heat medium pump 52. The heat medium pipe 10b is connected to the other port of the three-way valve 41. The heat medium pipe 10b is further connected to another port of the three-way valve 42. The return flow side of the heat exchanger 50 with respect to cooling water is connected to the other port of the three-way valve 42 through a cooling liquid pump 53. The heat medium 10a is connected to one port of a three-way valve 43. The return flow side of the heat exchanger 50 with respect to cooling water is connected to another port of the three-way valve 43. The other port of the three-way valve 43 is connected to the return flow side of the cold-heat heat medium tank 51. The heat medium pipes 9a and 10a are connected to sensible heat recovery pipes 45 through a valve 44.

This system has two high-temperature-side heat exchangers and two low-temperature-side heat exchangers which make two pairs respectively. Hence, refrigeration outputs are generated alternately in the two pairs. The specific operation of this system will be described below.

In the micro gas turbine electric power plant 1, fuel such as natural gas is imported and burned to operate the gas turbine 1a. Thus, the output of the gas turbine drives the electric generator 1b to generate electric power. The electric power is supplied to suitable electric appliances, equipment, etc.

In the gas turbine 1a, exhaust gas with waste heat at about 300° C. is generated by the burning of the fuel. The exhaust gas is delivered to the outside of the micro gas turbine electric plant 1 through the exhaust gas duct 2 and imported into the high-temperature-side heat exchanger 4 through the exhaust gas importing duct 3a. On this occasion, the rotation dampers 23 and 24 are located so as to open the heat exchanger 4a-side passage and close the heat exchanger 4b-side passage. Further, on this occasion, it is now to be assumed that hydrogen has been already stored in the hydrogen storage alloy contained in each of the alloy containers disposed in the heat exchangers 4a and 8 whereas hydrogen has been already released from the hydrogen storage alloy contained in each of the alloy containers disposed in the heat exchangers 4b and 7.

The exhaust gas propagating in the exhaust gas-importing duct 3a is imported into the heat exchanger 4a side in accordance with the rotation dampers 23 and 24. The exhaust gas then passes through gaps among the group of alloy containers 25 and is discharged from the exhaust duct 3b. Incidentally, the exhaust gas may be abolished directly or may be recycled as a heat source to obtain hot water.

In the group of alloy containers 25, waste heat in the exhaust gas is directly transmitted to the walls of the alloy containers by the passage of the exhaust gas to thereby heat the hydrogen storage alloy contained in the alloy containers. Incidentally, on this occasion, heat is transmitted on the exhaust gas-importing side corresponding to the area of the wall surface in each of the bare alloy containers 25 because the bare alloy containers 25 are disposed on the exhaust gas-importing side. On the other hand, the area of contact between the exhaust gas and each of the alloy containers 25 increases greatly to improve heat exchanging efficiency on the exhaust side because each of the exhaust side alloy containers 25 is provided with a large number of fins 28. Hence, waste heat is more efficiently transmitted to the hydrogen storage alloy on the exhaust side in which the temperature is going to become low, so that the hydrogen storage alloy can be heated more evenly on the whole of the group of containers 25. Stored hydrogen is released from the heated hydrogen storage alloy. The hydrogen passes through the aeration material 27 and reaches the hollow headers (not shown). The hydrogen is moved to the low-temperature-side heat exchanger 7 through the hydrogen-travelling pipe 6a by equilibrium pressure. Hence, in the low-temperature-side heat exchanger 7, the hydrogen is stored by the hydrogen storage alloy contained in the alloy containers 71. Incidentally, on this occasion, the heat medium pipes 9a and 9b are connected to the heat exchanger 50 with respect to cooling water by the operation of the three-way valves 40 to 43 to import cooling liquid into the heat exchanger 7 to cool the hydrogen storage alloy contained in the alloy containers 71 to thereby promote storage of hydrogen. This step corresponds to the step of reclaiming the low-temperature-side hydrogen storage alloy and also corresponds to the step of preparation for generating cold heat in a post-step.

On the other hand, the high-temperature-side heat exchanger 4b is in a state in which hydrogen is released from the hydrogen storage alloy with the aforementioned step as a pre-step, that is, in a state in which hydrogen is stored in the hydrogen storage alloy contained in the alloy containers 81.

The high-temperature-side heat exchanger 4b is in a state in which the group of alloy containers 26 is heated by exhaust gas in the same manner as described above, that is, in a state in which the group of alloy containers 26 and the hydrogen storage alloy contained in the group of alloy containers 26 are at a high temperature. In this state, in parallel with the aforementioned step, the valve 31a is opened (the valve 30a is in a closed state) to connect the cooling water pipe 5 to the heat exchanger 4b side inner pipe 31 to send cooling water from the cooling tower 35 by the pump 36 to apply the cooling water onto the group of alloy containers 26 to thereby cool the group of alloy containers 26 and the hydrogen storage alloy contained in the group of alloy containers 26. The cooling water applied onto the group of alloy containers 26 is recovered to the cooling water recovery tank 33 and returned to the cooling tower 35 through the cooling water pipe 5 by the pump 36.

Hydrogen equilibrium pressure of the hydrogen storage alloy contained in the group of alloy containers 26 is reduced by the aforementioned cooling, so that suction force of hydrogen is generated. The suction force is transmitted to the alloy containers 81 through the hydrogen-travelling pipe 6b. Hence, hydrogen is released from the hydrogen storage alloy contained in the alloy containers 81 by the suction force. The hydrogen is stored by the hydrogen storage alloy contained in the heat exchanger 4b through the hydrogen-travelling pipe 6b. In the alloy containers 81, cold heat is generated by the release of hydrogen. In the heat exchanger 8, the heat medium pipes 10a and 10b are connected to the cold-heat heat medium tank 51 by the operation of the three-way valves 40 to 43 to transmit the cold heat to the cold-heat heat medium circulating through the heat medium pipes 10a and 10b. Because the heat medium flows back to the heat medium tank 51, the heat medium is supplied to a refrigeration output portion 55 such as a refrigerator to generate a refrigeration output.

When the aforementioned operations are performed alternately in the combination of the heat exchangers 4a and 7 and the combination of the heat exchangers 4b and 8, the refrigeration output can be obtained continuously.

Incidentally, when the operations of the heat exchangers 7 and 8 are to be switched over, the valve 44 is opened to connect the heat exchangers 7 and 8 to each other through the sensible heat recovery pipe 45 to circulate the cold-heat heat medium between the heat exchangers 7 and 8 to thereby recover sensible heat from the alloy containers and the hydrogen storage alloy contained in the alloy containers.

As described above, in this refrigeration system, a refrigeration output can be generated efficiently even in the case where the temperature of waste-heat gas is relatively low. When this refrigeration system is attached to a micro gas turbine electric power plant, an energy generating system, which is very high in energy-utilizing efficiency, can be obtained as a whole. Moreover, in view of the environmental aspect, the refrigeration output can be obtained without giving any damage on the environment. It can be said that this system is excellent in the environmental aspect when this system is combined with the micro gas turbine electric power plant which is also excellent in the environmental aspect.

As described above, the low-temperature waste-heat-gas driven refrigeration system according to the present invention comprises: a high-temperature-side heat exchanger including high-temperature-side hydrogen storage alloy containers as a high-temperature-side heat exchanging portion, each of the high-temperature-side hydrogen storage alloy containers containing a hydrogen storage alloy so as to be capable of absorbing and releasing hydrogen into/from the high-temperature-side hydrogen storage alloy container, a low-temperature waste-heat gas or cooling heat medium being imported selectively into the high-temperature-side heat exchanger so that heat exchange is performed between the high-temperature-side heat exchanging portion and the low-temperature waste-heat gas or cooling heat medium; a low-temperature-side heat exchanger including low-temperature-side hydrogen storage alloy containers as a low-temperature-side heat exchanging portion, each of the low-temperature-side hydrogen storage alloy containers containing a hydrogen storage alloy so as to be capable of absorbing and releasing hydrogen into/from the low-temperature-side hydrogen storage alloy container, a cold-heat heat medium being imported into the low-temperature-side heat exchanger so that heat exchange i s performed between the low-temperature-side heat exchanging portion and the cold-heat heat medium, the low-temperature-side hydrogen storage alloy containers being connected to the high-temperature-side hydrogen storage alloy containers so that hydrogen can be moved therebetween; and a refrigeration output portion supplied with cold heat directly or indirectly by the cold-heat heat medium which receives cold heat in the low-temperature-side heat exchanger. Hence, such a relatively low temperature waste-heat gas can be used as a driving source to obtain a refrigeration output efficiently.

If a gas generated by combustion of fuel in a micro gas turbine is used as the aforementioned waste-heat gas, not only can the aforementioned effect be obtained but also the energy-utilizing efficiency of a micro gas turbine electric power plant relatively low in energy-utilizing efficiency can be improved greatly.

Moreover, the size of the system can be reduced. Hence, this system can be effectively applied to a high-efficient energy generating system in a small-scale enterprise such as a food processing factory or a convenience store requiring a refrigeration output in addition to electric power.

If each of the high-temperature-side hydrogen storage alloy containers is shaped like a pipe body containing a hydrogen storage alloy capable of being aerated in its inside and the high-temperature-side hydrogen storage alloy containers are arranged as a large number of containers so that gaps are formed among the pipe bodies and the heat exchanging portion is configured so that the waste-heat gas passes through the gaps in the direction crossing the longitudinal direction of the pipe bodies, heat can be recovered efficiently even from a relatively low temperature waste-heat gas. Hence, such a relatively low temperature waste-heat gas can be used efficiently as a source for driving a refrigeration system.

What is claimed is:

1. A low-temperature waste-heat-gas driven refrigeration system having a high-temperature-side heat exchanging portion and a low-temperature-side heat exchanging portion, comprising:

a high-temperature-side heat exchanger as the high-temperature-side heat exchanging portion, provided with high-temperature-side hydrogen storage alloy containers arranged substantially in parallel with each other so as to form gaps therebetween, wherein each of said high-temperature-side hydrogen storage alloy containers is provided with a pipe body and contains a hydrogen storage alloy disposed inside the pipe body, which is aerated for absorbing and releasing hydrogen;

an exhaust gas importing duct connected to said high temperature-side heat exchanger for delivering a low temperature waste-heat gas to said high temperature-side heat exchanger;

a cooling water pipe connected to said high temperature-side heat exchanger for delivering a cooling water to said high temperature-side heat exchanger, wherein one of the low temperature waste-heat gas and the cooling water is alternately delivered into said high temperature-side heat exchanger for performing heat exchange;

a low-temperature-side heat exchanger provided with low-temperature-side hydrogen storage alloy containers as the low-temperature-side heat exchanging portion, wherein each of said low-temperature-side hydrogen storage alloy containers contains a hydrogen storage alloy for absorbing and releasing hydrogen; and a plurality of heat medium pipes connected to said low-temperature-side heat exchanger for delivering a cold-heat heat medium into said low-temperature-side heat exchanger for performing heat exchange therebetween so as to obtain a cold heat at the low-temperature-side heat exchanger, wherein said low-temperature-side hydrogen storage alloy containers are connected to said high-temperature-side hydrogen storage alloy containers so that hydrogen moves therebetween, and wherein said cold heat is supplied into a refrigeration output portion through said cold-heat heat medium which receives said cold heat from said low-temperature-side heat exchanger.

2. A low-temperature waste-heat-gas driven refrigeration system according to claim 1, wherein said waste-heat gas is generated by combustion of fuel in a micro gas turbine.

3. A low-temperature waste-heat-gas driven refrigeration system according to claim 1, wherein said high-temperature-side heat exchanging portion is configured so that said waste-heat gas passes through said gaps in a direction crossing the longitudinal direction of said pipe bodies.

4. A low-temperature waste-heat-gas driven refrigeration system according to claim 1, further comprising:

a sensible heat recovery pipe connected to said heat medium pipes via a valve; and said low temperature-side heat exchanger includes two heat exchangers, wherein said valve is opened to connect said two heat exchangers of said low temperature-side heat exchanger to each other through the sensible heat recovery pipe for circulating the cold-heat heat medium between the two heat exchangers to thereby recover sensible heat from the alloy containers and the hydrogen storage alloy contained in the alloy containers corresponding to the alternating delivery of the low-temperature waste-heat gas and the cooling water into said high-temperature-side heat exchanger in order to facilitate the movement of the hydrogen between said high-temperature side heat exchanger and said low-temperature-side heat exchanger.

* * * * *